Jan. 6, 1959  J. R. MacLACHLAN  2,867,714
SUPPORT FOR STUD-WELDING GUN
Filed April 18, 1956
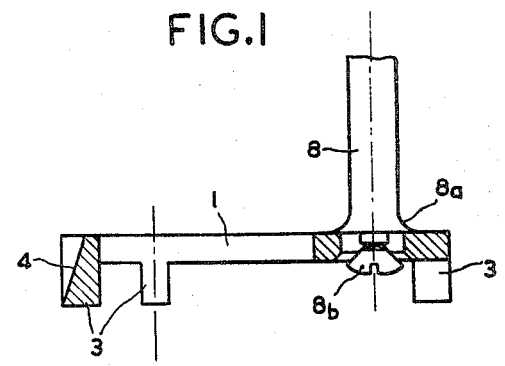
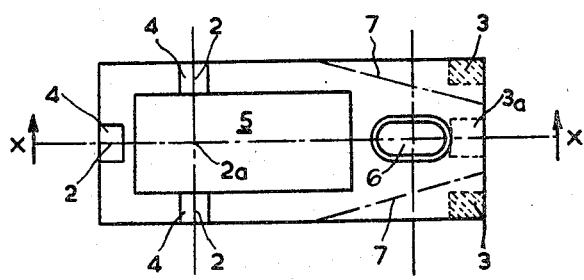
INVENTOR
JOHN ROBERT MACLACHLAN
BY Fred M. Vogel
AGENT

United States Patent Office 2,867,714
Patented Jan. 6, 1959

2,867,714

SUPPORT FOR STUD-WELDING GUN

John Robert MacLachlan, London, England, assignor, by mesne assignments, to North American Philips Company, Inc., New York, N. Y., a corporation of Delaware Application April 18, 1956, Serial No. 579,053

Claims priority, application Great Britain April 21, 1955

2 Claims. (Cl. 219—98)

This invention relates to a support for a stud-welding gun.

The support according to the invention is particularly suited for stud-welding guns of the type which comprises a stud-welding chuck at one end and means, usually a coil spring, urging the plunger in a direction to move the stud towards, and finally into engagement with the object to which the stud is to be welded. Usually the said object consists of a metal plate which may form part of a wall, ceiling or floor, but can also comprise a structural member such as a girder or engine part. The surface to which the stud is to be welded need not be a flat one, but may be curved as in the case of a pipe or tube. Throughout the present specification the said metal object will be referred to as the "workpiece."

Stud welding guns of the above mentioned type are known and usually comprise a leg for suuporting the gun upon the workpiece. The leg has associated with it a foot having an opening therein to receive and hold a ferrule which may either take the form of a shroud to prevent access of air to the stud tip during welding and prevent splashing of molten metal, or may take the form of a bush which surrounds the stud tip and is formed of ceramic or porcelain material. The stud is usually provided with a pointed tip which in cooperation with a centre-punch or drilled mark on the workpiece locates the stud in the desired position for welding. In other cases the locating is done by a template.

In a further known case, to which the present invention is particularly applicable, the stud is seated on a shoulder within the ferrule (sometimes referred to as a "cartridge"), the ferrule acting as a conductor for the current and initiating the arc. As the ferrule is consumed by the heat of the arc the stud passes through it into contact with the workpiece to which it is immediately united. In this latter case the usual locating means for the stud cannot be used since, initially the stud does not make contact with the workpiece and it is an object of the invention to provide a stud locating means for use with a ferrule of the last mentioned type.

According to the present invention therefore the foot part or base of the support for the stud-welding gun is provided with means determining the position that the stud is to occupy subsequent to the welding operation. This means consists of a plurality of datum lines or locating marks on the base which are adapted to be brought into alignment with corresponding datum marking-off lines on the workpiece.

The foot part or support of the invention consists of a plate supported by the workpiece and having an opening therein through which the stud extends into contact with the workpiece, the datum lines being disposed on peripheral portions of the foot such that a continuation of each line in one direction intersects the axis, or continuation of the axis, of the stud.

In order that the locating may be as accurately performed as possible the datum lines are formed on the foot so as to avoid errors due to parallax and to this end are formed on inclined surfaces of the foot such that a continuation of each line in the opposite direction to the stud axis intersects a datum line on the workpiece.

In order that the gases formed by melting of the ferrule can escape as rapidly as possible the foot is preferably supported in elevated position on the workpiece by projecting pieces provided between relieved portions of the foot, the said relieved portions constituting gas escape means.

The position of each inclined surface on the foot coincides with that of a projecting piece of the foot such that each datum line extends from, or substantially from, the workpiece surface to the surface of the foot remote from the workpiece.

In order that the invention may be more readily understood, one embodiment of the same will now be described more specifically with reference to the accompanying drawings in which:

Figure 1 shows a part sectional elevation along the line X—X of Figure 2 and

Figure 2 shows a plan view of the foot.

Preferably the foot 1 will asume a rectangular shape as shown in Figure 2, i. e., not a square shape, and have an opening 5 in its upper surface of considerably larger area than that required for passage of the stud and the ferrule (not shown) in order to provide for a rapid escape of the hot gas. The leg 8, supporting the welding gun (see Fig. 1), has a widened part 8a at its base for standing upon the foot 1 and is provided with securing means 8b, comprising a countersunk screw 8b, passing at one end into a screw threaded bore in the leg 8 and at its other end through a slotted aperture 6 at one end of the plate. This aperture has a countersunk edge on its lower surface corresponding with the inclined surface of the screw head. By slackening back the screw 8b, the position of the leg 8, and consequently the stud, can be adjusted relatively to the opening 5 in the foot.

The foot 1 is raised from a supporting surface by a plurality of projections 3 which thus ensure that adequate venting is provided for the escape of gas during welding. As can be seen from the drawings the projections 3 are provided with inclined, outwardly directed surfaces 4, these serving for the datum lines 2. Since there will preferably be three datum lines there will thus be three projections having inclined surfaces and these are provided at one end while two further projections, without datum markings, are provided at the corners of the opposite end. The intersecting point 2a of the datum lines conicides with the centre of the stud to be welded.

The desired location of each stud will be indicated on the workpiece by the usual marking-off lines at right angles to each other the intersecting point of which indicates the position of the stud centre. When positioning the foot, the intersecting point 2a of the datum lines thereon is brought adjacent the intersecting point of the marking-off lines and the foot plate 1 then manipulated until the three datum lines on the foot coincide exactly with three of the marking-off lines. The stud, which is held in the chuck, will then have its centre line exactly coincidental with the intersecting point of the marking-off lines and the welding operation can then proceed in the manner previously indicated.

It is not of course essential that three datum lines be used on the foot piece since two such lines disposed at an angle to each other would be effective, but it would take longer to obtain results which are equally accurate with those obtained by three or more datum lines.

Furthermore, the datum lines are only disposed at right angles to each other when the marking-off lines on the workpiece are at right angles.

When using the foot described above in connection with curved surfaces, such as on pipes, it is beneficial to rearrange the foot projecions 3 so that, with the longer sides of the rectangular plate disposed parallel to the pipe axis, the foot plate will be supported by only two projections 3 and 3a, which are disposed in line with the major axis of the rectangular plate 1 and the axis of the pipe. Two or three datum lines on the foot can then be lined up with two or three of the marking-off lines on the pipe and the stud accurately centered.

In order to prevent burning the foot is made from a high heat conductivity metal, preferably a berryllium-copper alloy. This alloy provides at the same time considerable strength to the foot.

The alloy preferably comprises beryllium 0.5%, cobalt 2.5% and the remainder copper.

Alternatively, the five projections 3, used in conjunction with the full outline of Fig. 2, could be retained, the single projection on the pipe axis being shortened and the side projections lengthened.

What is claimed is:

1. A support for a welding gun carrying a stud to be welded to a workpiece at the point of intersection of two perpendicular marking-off lines on the workpiece, comprising a base member adapted to be placed on the workpiece and provided with a welding opening substantially larger than the stud, at least two locating marks on said base member and lying one on each of two perpendicular lines having an intersection point within said opening, and means on said base member for supporting the welding gun with the stud at said intersection point.

2. A support for a welding gun carrying a stud to be welded to a workpiece at the point of intersection of two perpendicular marking-off lines on the workpiece, comprising a base member adapted to be placed on the workpiece and provided with at least two slanted surfaces and a welding opening substantially larger than the stud, at least two locating lines on said base member and lying one on each of said surfaces and in each of two perpendicular planes having an intersection line passing through said opening, and adjustable means on said base member for supporting the welding gun with the stud at said intersection line.

References Cited in the file of this patent

UNITED STATES PATENTS

| | | |
|---|---|---|
| 2,131,475 | Hensel et al. | Sept. 27, 1938 |
| 2,166,794 | Brophy | July 18, 1939 |
| 2,192,495 | Hessenbruch | Mar. 5, 1940 |
| 2,333,134 | Whitlock | Nov. 2, 1943 |
| 2,568,222 | Crecca et al. | Sept. 18, 1951 |
| 2,622,179 | Butterfield | Dec. 16, 1952 |
| 2,718,578 | Ruebel et al. | Sept. 20, 1955 |

FOREIGN PATENTS

| | | |
|---|---|---|
| 971,828 | France | Apr. 16, 1950 |